United States Patent [19]

Koslow

[11] Patent Number: 4,604,109

[45] Date of Patent: Aug. 5, 1986

[54] FLUID PURIFIER

[75] Inventor: Evan E. Koslow, Westport, Conn.

[73] Assignee: Pall Corporation, Glen Cove, N.Y.

[21] Appl. No.: 673,490

[22] Filed: Nov. 20, 1984

Related U.S. Application Data

[63] Continuation-in-part of Ser. No. 538,229, Oct. 3, 1983, abandoned.

[51] Int. Cl.⁴ ............................................. B01D 19/02
[52] U.S. Cl. ......................................... 55/52; 55/55; 55/87; 55/193; 55/203; 55/185; 210/DIG. 5
[58] Field of Search ................ 55/45, 52, 55, 87, 178, 55/184, 189–193, 199, 203, 206, 186, 177, 195; 210/DIG. 5

[56] References Cited

U.S. PATENT DOCUMENTS

| 2,064,650 | 12/1936 | Emanueli | 55/193 |
| 2,258,445 | 10/1941 | Coopey | 299/63 |
| 2,507,797 | 5/1950 | Martin | 55/52 |
| 2,869,838 | 1/1959 | Ryder | 55/203 |
| 2,908,346 | 10/1959 | Cornell | 55/192 |
| 3,228,174 | 1/1966 | Perry | 55/45 |
| 3,347,023 | 10/1967 | Scott | 55/193 |
| 3,810,347 | 5/1974 | Kartinen | 55/45 |
| 3,945,922 | 3/1976 | Iagusch et al. | 55/87 |
| 4,182,480 | 1/1980 | Theyse et al. | 55/203 |

FOREIGN PATENT DOCUMENTS

| 345805 | 12/1921 | Fed. Rep. of Germany . |
| 2259740 | 6/1974 | Fed. Rep. of Germany . |
| 581422 | 5/1924 | France . |
| 856461 | 12/1960 | United Kingdom . |
| 872334 | 7/1961 | United Kingdom . |
| 1020213 | 6/1966 | United Kingdom . |
| 2032086 | 4/1980 | United Kingdom . |
| 2061755 | 5/1981 | United Kingdom . |

OTHER PUBLICATIONS

Aldrich et al., International Journal of Applied Radiation and Isotopes, vol. 25, 1974, pp. 15–18.

Primary Examiner—Charles Hart
Attorney, Agent, or Firm—Leydig, Voit & Mayer, Ltd.

[57] ABSTRACT

The disclosure describes a device for separating a substantial fraction of a volatile contaminant from a contaminated fluid. The device comprises a vacuum chamber having an internal space that may be at least partially evacuated, at least one rotating plate disposed within the vacuum chamber with the edge of the rotating plate being spaced from a coalescing means, means for introducing the contaminated fluid onto the surface of the plate whereby small droplets of the contaminated fluid are centrifugally dispersed from the edge of the rotating plate. The distance between the edge of the rotating plate and the coalescing means yields a sufficient droplet residence time to permit the fraction of the volatile contaminant to be separated from the contaminated fluid as the droplets travel between the edge of the rotating plate and the coalescing means.

17 Claims, 4 Drawing Figures

FLUID PURIFIER

This application is a continuation-in-part application of application Ser. No. 538,229 filed Oct. 3, 1983 and now abandoned.

FIELD OF THE INVENTION

The present invention relates to fluid purifiers. In particular, it relates to purifiers for fluids containing volatile contaminants.

BACKGROUND OF THE INVENTION

Fluids frequently become contaminated during use and must be purified before they can be recycled. For example, lubricants, hydraulic fluids, transformer oils, and cutting fluids often become contaminated with water, cleaning solvents, or other volatile contaminants which must be separated from the fluids before the fluids can be reused.

A variety of fluid purifiers have been previously designed based on the use of heat or vacuum or both to separate a volatile contaminant from a fluid. One problem with previous fluid purifiers is providing sufficient purification in a single pass through the purifier without harming the fluid itself. Purifiers with harsh processing conditions, such as excessive heat or excessive vacuum, may provide sufficient purification in a single pass, but they often have destructive effects on the fluids being purified. For example, the fluid can be seriously altered through the loss of low boiling point components, removal of additives, or oxidation or charring of the fluid.

Purifiers with milder processing conditions, such as lower temperature or lower vacuum, may not harm the fluid being purified, but they often provide only partial purification in a single pass. The fluid must be pumped through the purifier many times for sufficient purification. This multi-pass approach substantially increases the amount of energy and time needed to purify the contaminated fluid.

A problem with previous fluid purifiers based on the use of a vacuum is producing a large enough surface area for a given volume of fluid to allow sufficient release of the contaminant. There is less resistance to the release of volatile contaminants at or near the surface of the fluid than within the body of the fluid. Insufficient surface area results in only partial purification, again making it necessary to pump the fluid through the purifier many times before the fluid is sufficiently purified.

Another problem with previous vacuum purifiers is that their performance varies substantially with the viscosity of the contaminated fluid. These purifiers usually use some medium, such as a downward flow column, to form a thin film of the contaminated fluid which increases the surface area of the fluid. If the fluid is viscous, however, it forms a thick film. The release of volatile contaminants from the body of the thick film is a much slower process which increases the time required to purify the fluid.

SUMMARY OF THE INVENTION

A general object of the present invention is to provide an improved fluid purifier. Specific objects include providing a fluid purifier: (1) that sufficiently purifies the fluid in a single pass through the purifier without significantly deteriorating or altering the fluid itself; (2) that produces a very large surface area for a given volume of fluid; (3) that exhibits a relatively narrow variation in performance through a wide range of fluid viscosity; and (4) that requires a minimum amount of energy and time to purify the fluid.

Accordingly, the invention may be embodied by a fluid purifier for separating a substantial fraction of a volatile contaminant from a contaminated fluid. The fluid purifier includes a chamber defining a space that may be at least partially evacuated, at least one rotating plate located within the chamber, and a device for introducing the contaminated fluid onto the surface of the rotating plate. The rotating plate has a continuous surface and the introducing device includes a portion disposed generally concentrically with respect to the plate for directing a flow of the fluid onto the surface of the plate. Due to the centrifugal effects of the rotating plate, the contaminated fluid migrates to the edge of the plate and is sprayed outward in the form of very small droplets, such droplets yielding a very large surface area in relation to the volume of the fluid. The fluid purifier further includes a structure for against which the small droplets may impinge and merge to form a purified fluid. The merging structure is spaced from the edge of the rotating plate a distance which gives the droplets sufficient residence time while transversing the distance between the plate and the merging structure to permit a fraction of the volatile contaminant to be separated from the contaminated fluid. Specifically, the volatile contaminant is rapidly released from each droplet in the form of a vapor, leaving behind a purified droplet. The vaporized volatile contaminant may be removed from the chamber by a vacuum pump. For convenience, the chamber itself may be sized such that the droplets impinge against the interior surface to merge and form the purified fluid.

The present invention may also be embodied by an integrated purification system for removing particulates as well as volatile contaminants from a contaminated fluid. The purifying system comprises at least one pump for moving the fluid through the system, an initial filter for removing particulates, and the fluid purifier described in the preceding paragraph.

The present invention achieves each of the objects stated above. Further, it provides a fluid purifier that purifies a wide spectrum of fluids. This fluid purifier is small and lightweight yet has a large purifying capacity and operates with a high degree of reliability.

Other objects, aspects and advantages of the invention will become apparent upon studying the following detailed description and accompanying drawings of a preferred embodiment and the claims to the invention.

DESCRIPTION OF A PREFERRED EMBODIMENT OF THE INVENTION

Figure 1:
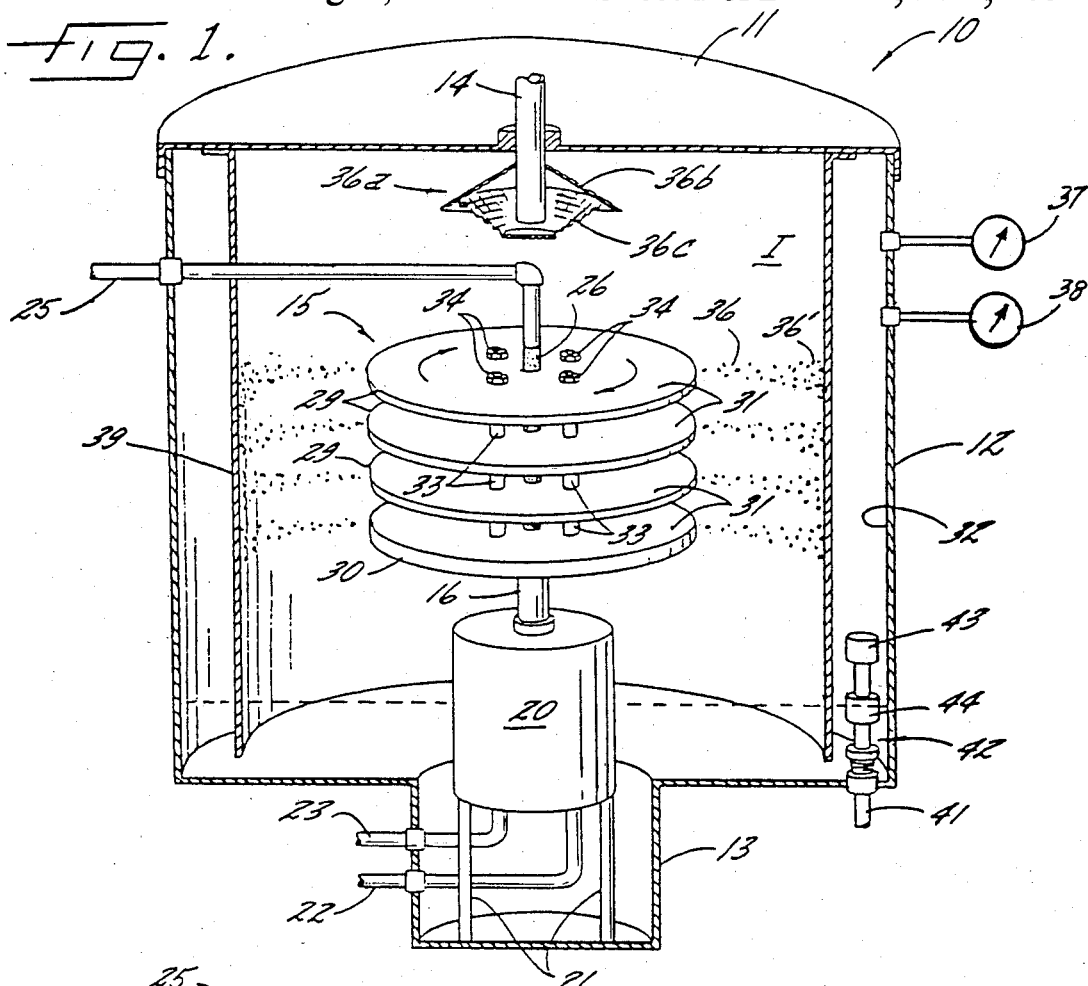
FIG. 1 is a sectional perspective view of a fluid purifier embodying the present invention.

As shown in FIG. 1, the fluid purifier 10 comprises a vacuum chamber 11 which includes a bonnet 12 and a well 13. The vacuum chamber 11 defines an evacuated space I. A vacuum pump (not shown in FIG. 1), which communicates with the vacuum chamber 11 via an exhaust port 14, establishes and maintains the vacuum.

Within the bonnet 12, a plate assembly 15 is mounted for rotation to the drive shaft 16 of a hydraulic motor 20. The hydraulic motor 20 is mounted to supports 21 which, in turn, are mounted to the vacuum chamber 11 within the well 13.

Alternatively, the plate assembly 15 could be rotated by an electric or pneumatic motor disposed either inside or outside the vacuum chamber 11. A hydraulic motor 20 disposed within the vacuum chamber 11 is particularly advantageous, however, because no rotating vacuum seal is required and because the hydraulic motor 20 is highly reliable and efficient. On the other hand, an electric motor disposed outside the vacuum chamber may be more economical.

In operation, a suitable hydraulic fluid is pumped into a feed port 22 by a feed pump (not shown in FIG. 1), driving the hydraulic motor 20 and thereby rotating the plate assembly 15. The hydraulic fluid then exits the hydraulic motor 20 through a fluid port 23. The contaminated fluid enters the bonnet 12 through an inlet port 25, where it is fed to the rotating plate assembly 15 by a flow distributor 26. In one embodiment of the invention, the contaminated fluid serves as the hydraulic fluid, i.e., the contaminated fluid is first pumped into the hydraulic motor 20 via the feed port 22 and, upon exiting through the fluid port 23, is fed directly into the bonnet 12 through the inlet port 25. In this embodiment, the speed of rotation of the plate assembly 15 is governed by the feed pump, and the motor speed is matched to the feed rate to provide a constant level of performance. It is contemplated that a rotational speed of approximately 6150 rpm will provide satisfactory results.

Figure 2:
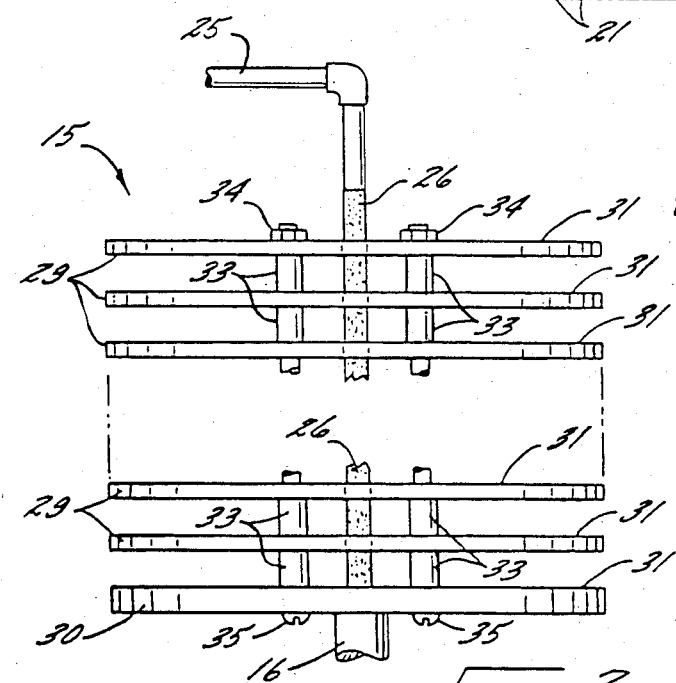
FIG. 2 is a partial elevation view of the plate assembly component of the fluid purifier of FIG. 1.

As shown in FIG. 2, the plate assembly 15 comprises a stack of disks 29 supported by a support plate 30 which is attached to the drive shaft 16. For example, the stack may comprise as many as twenty-four or more disks 29 supported by a single support plate 30. The disks 29 and the support plate 30 may be fashioned from any of a variety of materials, provided the materials can withstand the rotational speeds contemplated. Nylon and aluminum are examples of materials which might be used. The disks 29 are stacked one on another with their centers aligned, the line formed by their centers being perpendicular to the top surfaces 31 of the disks 29, and the top surface 31 of each disk 29 defines a plane which intersects the wall 32 of the vacuum chamber 11. The disks 29 are separated from one another and from the support plate 30 by hollow spacers 33. The plate assembly 15 is bolted together by nuts 34 and bolts 35 running through the disks 29, the support plate 30 and the hollow spacers 33. The flow distributor 26 extends through the center of each disk 29 aligned with the drive shaft 16. As assembled, the surface of each disk 29 and support plate 30 of the plate assembly 15 is continuous and unbroken, interrupted only by the flow distributor 26 and the spacers 33 or nuts 34.

Figure 3:
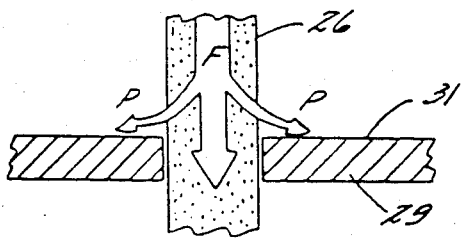
FIG. 3 is an enlarged sectional elevation view of the center portion of one of the disks in the plate assembly component of FIG. 2.

As shown in FIG. 3, at each rotating disk 29, a portion P of the flow F of contaminated fluid feeds through the flow distributor 26 and onto the top surface 31 of the disk 29. The flow distributor 26 may, for example, comprise a rod-like member formed of a porous material. In systems where the contaminated fluid is filtered through a relatively fine pre-filter (e.g., on the order of 10-20 microns), a relatively coarse material may be employed for the flow distributor 26. Specifically, a porous material having a 30-plus mesh should provide satisfactory results. Due to the centrifugal effects of each rotating disk 29, contaminated fluid which feeds onto the surface 31 of a disk 29 migrates to the edge of the disk 29 and is then dispersed, i.e., sprayed outward, in the form of very small droplets 36, as shown in FIG. 1. The energy required to produce the droplets 36 is fixed at a low value, approximately that required to rotate the free-spinning plate assembly 15.

Generally, the size of each droplet 36 emitted from the edge of each disk 29 will lie within a range distributed about a theoretical size which can be determined from the following equation for monodisperse droplet generation:

$$d = \frac{K}{V(D\rho/T)^{\frac{1}{2}}}$$

where d equals the theoretical droplet diameter, V equals the disk rotational velocity, D equals the disk diameter, $\rho$ equals the fluid density, T equals the fluid surface tension, and K is an empirical constant approximately equal to 4.5 when the other variables are expressed in cgs units and V is in rpm. For example, if a fluid having a density of one gram per cubic centimeter and a surface tension of ten dynes per centimeter is introduced onto the surface of an 8-inch disk rotating at 6150 rpm, droplets emitted from the edge of the disk are expected to have diameters distributed about a theoretical droplet diameter of approximately five micrometers.

As seen from the above equation, the size of each droplet 36 generated by the rotating disk 29, and therefore the surface area of the droplet 36, is largely independent of fluid viscosity, which can vary from fluid to fluid by several orders of magnitude. Rather, the droplet size depends on fluid density and surface tension, which are normally within a narrow band of values. Thus, a wide spectrum of fluids may be dispersed in the form of very small droplets, and while the performance of the purifier 10 may vary somewhat with viscosity of the fluid being processed, the range of performance is expected to be relatively high even for relatively viscous fluids.

Generally, it is contemplated that fluid purifiers 10 embodying the present invention be constructed and operated so they define a theoretical droplet diameter preferably of about 40 micrometers or less and most preferably within the range from about 20 micrometers to about 2.5 micrometers. It is expected that the diameters of droplets actually generated will be distributed about the theoretical droplet diameter. However, the generation of droplets will deviate from that described above when the rate that the contaminated fluid is supplied to each disk 29 exceeds a certain limit. This limiting flow rate for each disk 29 has been theorized to be:

$$Q(max) = 4\pi^2 R^2 Vd = \frac{\pi^2 R^2 K}{(2R\rho/T)^{\frac{1}{2}}}$$

where R equals the disk radius and d equals the theoretical droplet diameter as given above. In general, the preferred flow rate is maintained at 10% to 25% of Q(max).

As the droplets 36 of contaminated fluid are formed, discharged from the edge of the rotating disk 29 and travel toward the chamber wall 32 with a sufficient residence time within the evacuated space I, a substantial fraction of the volatile contaminant may be released from the droplet 36 into the evacuated space I, leaving behind a purified droplet 36'. Generally, the majority of the resistance to the release of the volatile contaminant from the contaminated fluid occurs within the volume of the fluid. However, the very small droplets 36 generated by the rotating disk 29 yield very large surface area-to-volume ratios for the fluid. The diffusion distance within the droplet 36 is very small and the resistance to release is minimized. Volatile contaminants tend to flash from the droplet 36 very rapidly, necessitating a very short residence time for the droplet 36 within the space I to attain a substantial degree of purification and thereby allowing fluids to be substantially purified in a single pass. For example, for a five micrometer droplet 36 discharged from the disk 29 at a velocity of about 6400 centimeters per second (i.e., the linear velocity at the edge of the above suggested 8-inch disk rotating at 6150 rpm) in a vacuum chamber 11 having an inside diameter of about 60 centimeters, the resulting residence time of approximately four milliseconds is sufficient to allow a high degree of purification. This short residence time, coupled with small disk size, makes possible a small, compact design for the purifier 10, e.g., a purifier only 60 cm in diameter.

To facilitate the release of the contaminant, the purifier 10 may operate at a moderate vacuum, with the fluid maintained at a temperature only slightly higher than the ambient temperature. For example, a vacuum of approximately 22 inches of mercury and a contaminated fluid temperature of approximately 130 degrees Fahrenheit is expected to provide very satisfactory results. Chamber vacuum and temperature gauges 37, 38 monitor the vacuum and temperature, respectively. The moderate vacuum does not significantly deteriorate or alter the fluid itself because of the short residence time of the fluid within the purifier 10. Single-pass purification and the use of moderate temperatures reduce the amount of energy required to purify the fluid.

After the volatile contaminant has been released from the droplet 36, the vaporized contaminant is drawn from the vacuum chamber 11 through the exhaust port 14 by the vacuum pump (not shown in FIG. 1). An oil mist baffle assemble 36a comprising a hood 36b and a screen 36c covers the exhaust port 14. As the vaporized contaminant, or any other gas within the vacuum chamber 11, is withdrawn through the exhaust port 14, the screen 36c filters any oil mist from the gas. A 60 mesh screen should provide satisfactory results. The purified droplets 36' impinge or impact a removable sleeve 39 disposed between the plate assembly 15 and the chamber wall 32. Since the removable sleeve 39 reduces the effective inside diameter of the vacuum chamber 11, it reduces the residence time of the droplets 36, 36'. A series of removable sleeves having progressively larger diameters may be provided which allow progressively larger residence times up to a maximum residence time defined by the chamber wall 32.

Upon impact, the purified, droplets 36' coalesce, i.e., merge to form a fluid film, as a purified fluid. Since the droplets 36' have a large surface tension relative to their available kinetic energy, they coalesce against the removable sleeve 39 rather than shatter to create a secondary fluid aerosol. The purified fluid drains down the removable sleeve 39 and collects in the lower portion of the vacuum chamber 11. The purified fluid is drained from the vacuum chamber 11 through a drain port 41 by means of a return pump (not shown in FIG. 1) which is controlled by a level switch 42 located at the bottom of the bonnet 12. The level switch 42 comprises a high-level indicator 43 that activates the return pump and a low-level indicator 44 that deactivates the return pump.

Since the fluid may be substantially purified in a single dispersion, the total purificatin time, i.e., the amount of time it takes the fluid to pass through the fluid purifier 10 from the inlet port 25 to the drain port 41, is short. This short purification time, coupled with the plurality of disks 29, greatly enhances the capacity of the fluid purifier 10. Further, while the fluid may be substantially purifed in a single pass, even higher levels of purification may be obtained in two or more passes.

Tests have been run on a fluid purifier embodying the invention and comprising a single 8-inch disk mounted for rotation within a circular vacuum chamber with an inside diameter of 24 inches. The disk was driven by a hydraulic motor mounted within the vacuum chamber and the hydraulic motor, in turn, was driven by the flow of a hydraulic fluid separate from the contaminated fluid. A feed tube, which terminated about three-sixteenths of an inch above the center of the rotating plate, introduced the contaminated fluid onto the surface of the disk.

Three different oils, each initially contaminated with water to a concentration of 5000 ppm, were purified at various combinations of temperature and pressure. The three oils may be identified by the following military designations: MIL-L-17331, MIL-L-23699, and MIL-H-5606. The oil designated as MIL-L-17331 has a viscosity ranging from about 80 centipoise at 100 degrees Fahrenheit to about 18 centipoise at 160 degrees Fahrenheit, the oil designated as MIL-L-23699 has a viscosity ranging from about 24 centipoise at 100 degrees Fahrenheit to about 8 centipoise at 160 degrees Fahreneheit, and the oil designated as MIL-H-5606 has a viscosity ranging from about 12 centipoise at 100 degrees Fahrenheit to about 6.2 centipoise at 160 degrees Fahrenheit.

Several sets of purification runs were made, and in each set one of the oils, as initially contaminated, was fed at a rate of about ¾ gallon/minute onto the 8-inch disk, which was rotated at a rate of about 6100 rpm. During each run within a set, the inlet temperature of the contaminated oil and the vacuum within the chamber were maintained as a constant. However, from one run to another, either or both the temperature and vacuum were varied. After the contaminated oil was dispersed from the edge of the rotating disk, coalesced against the inside of the chamber wall, and drained from the chamber, the percentage of water removed from the oil as initially contaminated was determined. The results of these purification runs are presented in tables I and II for a single pass and a double pass, respectively, through the purifier.

TABLE I

| | Percentage Of Water Removed In One Pass | | | |
|---|---|---|---|---|
| Vacuum | Average In Temperature (Fahrenheit) | | | |
| | Oil Designated MIL-H-5606 | | | |
| ("Hg) | 82–93 | 100–105 | 129–134 | 158–164 |
| 10 | 21 | 36 | 60 | 84 |
| 15 | 22 | 22 | 63 | 61 |
| 20 | 24 | 35 | 64 | 76 |
| 22 | 29 | 37 | 54 | 88 |
| | Oil Designated MIL-L-23699 | | | |
| ("Hg) | 85–96 | 98–109 | 129–132 | 154–163 |
| 10 | 19 | 18 | 39 | 58 |
| 15 | 19 | 29 | 45 | 63 |

TABLE I-continued

| Percentage Of Water Removed In One Pass | | | | |
|---|---|---|---|---|
| Vacuum | Average In Temperature (Fahrenheit) | | | |
| 20 | 22 | 24 | 47 | 70 |
| 22 | 35 | 50 | 60 | 73 |
| Oil Designated MIL-L-17331 | | | | |
| ("Hg) | | 103–114 | | 157–163 |
| 22 | | 14 | | 70 |
| 25 | | 15 | | 55 |

TABLE II

| Percentage Of Water Removed In Two Passes | | | | |
|---|---|---|---|---|
| Vacuum | Average In Temperature (Fahrenheit) | | | |
| Oil Designated MIL-H-5606 | | | | |
| ("Hg) | 82–93 | 100–105 | 129–134 | 158–164 |
| 10 | 36 | | 86 | 92 |
| 15 | 41 | 47 | 88 | 91 |
| 20 | 43 | 63 | 89 | 93 |
| 22 | 59 | 71 | 90 | 90 |
| Oil Designated MIL-L-23699 | | | | |
| ("Hg) | 85–96 | 98–109 | | 154–163 |
| 10 | 42 | 51 | | 78 |
| 15 | 42 | 55 | | 81 |
| 20 | 51 | 56 | | |
| 22 | 62 | | | |
| Oil Designated MIL-L-17331 | | | | |
| ("Hg) | | 103–114 | | 157–163 |
| 22 | | 30 | | 95 |
| 25 | | 27 | | 88 |

Figure 4:
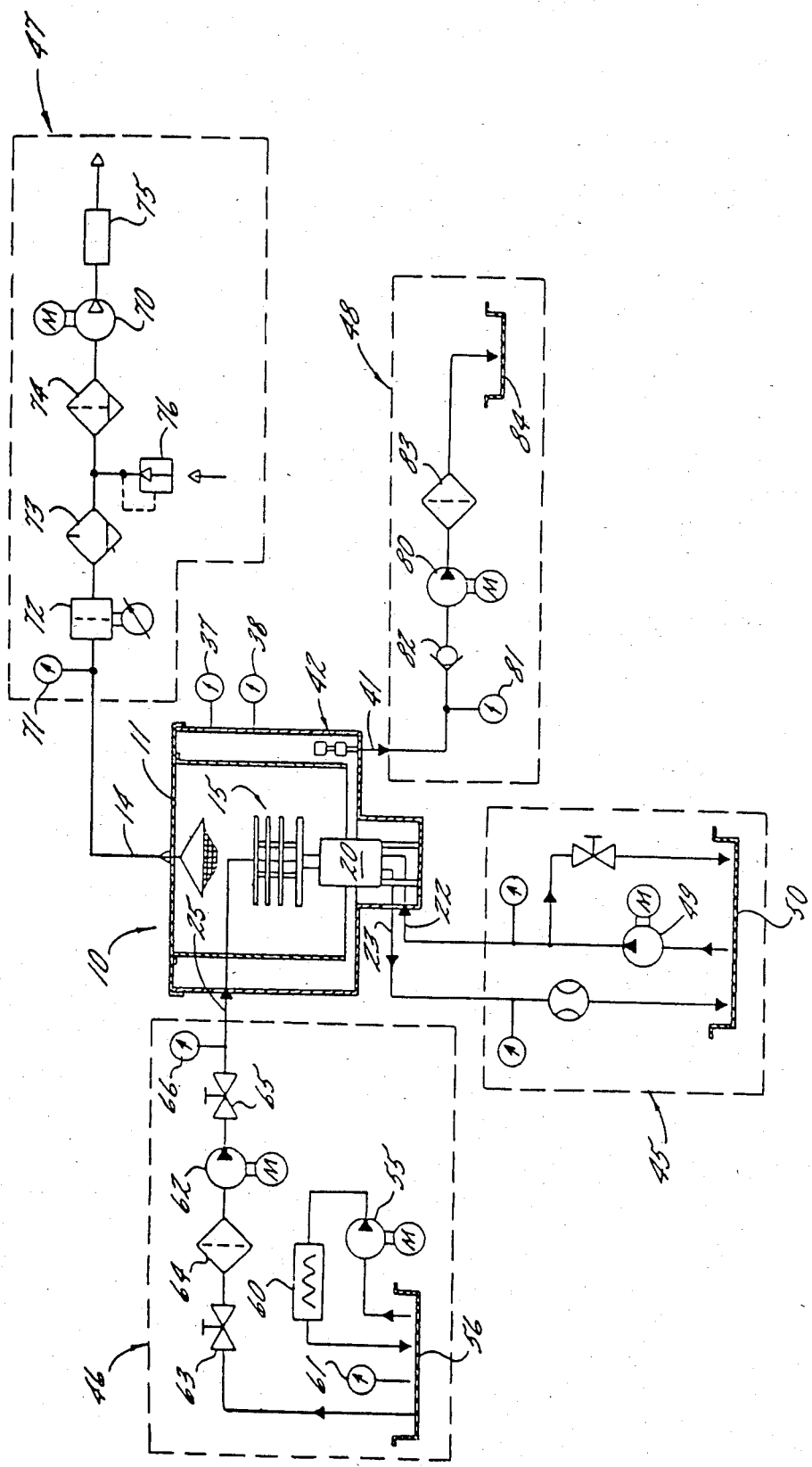
FIG. 4 is a block diagram of a fluid purifying system incorporating the fluid purifier of FIG. 1.

The fluid purifier 10 of FIG. 1 can be readily incorporated in an integrated fluid purifying system that removes particulates as well as volatile contaiminants. As shown in FIG. 4, the fluid purifying system comprises a hydraulic fluid drive system 45, a contaminiated fluid feed system: 46, a vacuum maintenance system 47, and a purified fluid removal system 48 in addition to the fluid purifier 10. The hydraulic motor 20 of this embodiment of the fluid purifier 10 is driven by a separate hydraulic fluid supplied by the hydraulic fluid drive system 45. A hydraulic fluid feed pump 49 circulates the hydraulic fluid between a hydraulic fluid reservoir 50 and the hydraulic motor 20 with the hydraulic fluid entering the fluid purifier 10 at the feed port 22 and exiting at the fluid port 23. The inlet and outlet pressures at the hydraulic motor 20 are monitored by first and second vacuum gauges 51, 52, respectively, and the flow through the hydraulic motor 20 is monitored by a flowmeter 53. A relief valve 54 is disposed between the hydraulic fluid feed pump 49 and the hydraulic motor 20.

The contaminated fluid is warmed and fed to the fluid purifier 10 by the contaminated fluid feed system 46. A circulation pump 55 circulates the contaminated fluid between a contaminated fluid reservoir 56 and a heater 60 which is designed to maintain the contaminated fluid at a temperature only slightly above the ambient temperature, as monitored by a reservoir temperature gauge 61. The contaminated fluid is drawn from the contaminated fluid reservoir 52 to the fluid purifier 10 by the vacuum in the fluid purifier 10 or by an optional feed pump 62. In route, the contaminated fluid passes through a ball valve 63 and an initial particulate filter 64 which removes most of the particulates in the contaminated fluid. From the initial particulate filter 64, the contaminated fluid is drawn through a needle valve 65, past a fluid inlet temperature gauge 66, and into the fluid purifier 10 through the feed port 22, where the volatile contaminant is separated from the contaminated fluid as previously described.

The vacuum maintenance system 47 removes the vaporized volatile contaminant from the fluid purifier 10 in addition to maintaining the vacuum. A vacuum pump 70 draws the gases in the fluid purifier 10, including the vaporized volatile contaminant, through the exhaust port 14, past a gas outlet temperature gauge 71, and through a gas-flow orifice plate 72 which monitors the gas-flow. Since this gas may also contain droplets of the fluid being purified, the gas is also drawn through an oil trap 73 and a coalescing filter 74 before being exhausted through a muffler 75. A vacuum relief valve 76 permits relief of the vacuum if, for example, access within the fluid purifier 10 is desired.

The purified fluid removal system 48 includes a return pump 80 which is controlled by the level switch 42 in the fluid purifier 10. When activated, the return pump 80 pumps the purified fluid from the fluid purifier 10 through the drain port 41, past a discharge fluid temperature gauge 81, and through a check valve 82 which prevents back flow into the fluid purifier 10. From the check valve 82, the purified fluid is pumped through through a final particulate filter 83 and into a purified fluid reservoir 84.

While particular embodiments of the invention have been described above, the invention is not so limited. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as claimed.

I claim:

1. A device for separating a substantial fraction of a volatile contaminant from a contaminated fluid, said device comprising a vacuum chamber, the internal space of which may be at least partially evacuated; means for dispersing the contaminated fluid into small droplets including at least one rotating plate disposed within the vacuum chamber and having a continuous surface and means for introducing the contaminated fluid onto the surface of the plate, said introducing means including means disposed generally concentrically with respect to the plate for directing a flow of fluid onto the surface of the plate; and wall means spaced from the rotating plate against which the small droplets impinge and merge to form a purified fluid, the distance between the edge of the rotating plate and the wall menas yielding a sufficient droplet residence time to permit a fraction of a volatile contaminant to be separated from the contaminated fluid as the droplets travel between the edge of the rotating plate and the wall means.

2. The separating device of claim 1 further comprising a plate assembly having a stack of disks spaced from one another, the centers of the disks lying along a line perpendicular to the surface of each disk, and wherein the directing means includes means for depositing the contaminated fluid on the surface of each disk.

3. The separating device of claim 2 wherein the depositing means comprises a porous flow distributer disposed coaxially along the perpendicular line.

4. The separating device of claim 1 wherein the dispersing means comprises means for generating droplets of fluid having diameters distributed about a theoretical droplet diameter of about 40 micrometers or less according to the formula:

$$d = \frac{K}{V(D\rho/T)^{\frac{1}{2}}}$$

where d equals the theoretical droplet diameter, V equals the disk rotational velocity, D equals the disk diameter, ρ equals the fluid density, T equals the fluid surface tension, and K is an empirical constant approxiately equal to 4.5 when the other variables are expressed in cgs units and V is in rpm.

5. The separating device of claim 1 further comprising means for varying the distance between the edge of the rotating plate and the wall means.

6. The separating device of claim 1 wherein the dispersing means further includes at least a second rotating plate disposed within the vacuum chamber and wherein the directing means includes inlet means for receiving a flow of contaminated fluid into the vacuum chamber and means for distributing first and second portions of the flow onto the first and second plates, respectively.

7. A method of separating a substantial fraction of a volatile contaminant from a contaminated fluid, said method comprising the steps of providing a space which may be at least partially evacuated; introducing the contaminated fluid onto the surface of a plate disposed within the evacuated space; rotating the plate to disperse small droplets of the contaminated fluid from the edge of the plate, the small droplets having diameters distributed about a theoretical droplet diameter of about 40 micrometers or less according to the formula:

$$d = \frac{K}{V(D\rho/T)^{\frac{1}{2}}}$$

where d equals the theoretical droplet diameter, V equals the disc rotational velocity, D equals the disc diameter, ρ equals the fluid density, T equals the fluid surface tension and K is an empirical constant approximately equal to 4.5 when the other variables are expressed in cgs units and V is in rpm; spacing a surface distance from the edge of the rotating plate sufficent to yield a droplet residence time within the evacuated space that permits at least a substantial fraction of a volatile contaminant to be vaporized as the droplet travels between the edge of the rotating plate and the surface; and impinging and merging the small droplets against the surface.

8. A device for separating a substantial fraction of a volatile contaminant from a contaminated fluid, said device comprising a vacuum chamber, the internal space of which has been at least partially evacuated; at least one rotating plate mounted for rotation within the vacuum chamber, said plate having a continuous surface generally defining a plane which intersects an internal surface of the vacuum chamber at a distance spaced from the peripheral edge of the plate; means for introducing the contaminated fluid onto the surface of the plate, said introducing means including means disposed generally concentrically with respect to the plate for directing a flow of fluid onto the surface of the plate; means for rotating the plate whereby small droplets of the contaminated fluid are centrifugally thrown from the surface of the plate toward said internal surface of the vacuum chamber, the distance between the edge of the plate and the internal surface yielding a sufficient droplet residence time to permit a substantial fraction of the volatile contaminant to be separated from the contaminated fluid as the contaminated droplets travel between the edge of the plate and said internal surface, the small droplets impinging and merging as a purified fluid through impaction on said internal surfaces.

9. The separating device of claim 8 further comprising means disposed within the vacuum chamber for collecting the purified fluid, means communicating with the collecting means for removing the purified fluid from the vacuum chamber, and means communicating with the evacuated space defined by the vacuum chamber for drawing the released contaminant from the vacuum chamber.

10. The separating device of claim 8 wherein the means for rotating the plate includes a motor attached to the device.

11. The separating device of claim 10 wherein the motor comprises a hydraulic motor mounted within the vacuum chamber.

12. The separating device of claim 11 wherein said hydraulic motor is driven by the flow of the fluid prior to introduction onto the plate.

13. The separating device of claim 8 further comprising at least a second plate mounted for rotation within the vacuum chamber and wherein the introducing means includes inlet means for receiving a flow of contaminated fluid into the vacuum chamber and the directing means includes means for distributing first and second portions of the flow onto the first and second plates, respectively.

14. The separating device of claim 13 wherein the second plate is disposed in a spaced parallel relationship to the first plate and the centers of the first and second plates lie on a line perpendicular to a plane defined by each plate and wherein the distributing means comprises a flow distributor disposed coaxially along the perpendicular line.

15. A system for purifying a contaminated fluid containing particulates and volatile contaminants, said system comprising means for moving the fluid through the system; in initial filter for removing at least a portion of the particulates from the contaminated fluid; means for separating a substantial fraction of the volatile contaminant from the contaminated fluid, said separating means being located downstream from the filter and including a vacuum chamber, the internal space of which may be at least partially evacuated, at least one plate mounted for rotation within the vacuum chamber, said plate having a continuous surface, means for introducing the contaminated fluid onto the surface of the plate, said introducing means including means disposed generally concentrically with respect to the plate for directing a flow of fluid onto the surface of the plate, means for rotating the plate whereby small droplets of the contaminated fluid are centrifugally thrown from the edge of the plate toward an internal surface within the vacuum chamber, the distance between the edge of the plate and the internal surface yielding a sufficient droplet residence time to permit a substantial fraction of the volatile contaminant to be separated from the contaminated fluid as the droplet travel between the edge of said plate and said internal surface, means for merging the small droplets, and means for collecting the purified fluid; means for removing the purified fluid from the vacuum chamber; and exhaust means for venting the released volatile contaminant from the vacuum chamber including a coalescing filter fluidly communicating with the removing means.

16. The purifying system of claim 15 wherein the removing means including a final filter for removing additional particulates.

17. The purifying system of claim 15 further comprising means for heating the contaminated fluid.

* * * * *